United States Patent [19]
Camarasa et al.

[11] 3,788,070
[45] Jan. 29, 1974

[54] PURIFICATION OF INTERNAL COMBUSTION ENGINE EXHAUST GAS

[75] Inventors: Mario Camarasa, Ostia Lido Rome, Italy; Bernhard Josef Kraus, Linden, N.J.

[73] Assignee: Esso Research Engineering Company, Linden, N.J.

[22] Filed: June 12, 1972

[21] Appl. No.: 262,132

[52] U.S. Cl. .................. 60/290, 23/277 C, 60/282, 60/298, 60/305, 60/306
[51] Int. Cl. ......................... F02b 75/10, F01n 3/10
[58] Field of Search ..... 60/298, 289, 290, 304, 305, 60/306, 307, 323, 282, 317, 900; 23/277 C

[56] References Cited
UNITED STATES PATENTS

| | | | |
|---|---|---|---|
| 2,833,615 | 5/1958 | Kollgaard | 60/310 |
| 3,577,728 | 5/1971 | Brimer | 60/282 |
| 3,630,032 | 12/1971 | Grainger | 60/298 |
| 3,635,031 | 1/1972 | Haddad | 60/323 |
| 3,658,482 | 4/1972 | Evans | 23/277 C |

FOREIGN PATENTS OR APPLICATIONS

| | | | |
|---|---|---|---|
| 413,967 | 7/1934 | Great Britain | 60/298 |

*Primary Examiner*—Douglas Hart
*Attorney, Agent, or Firm*—Leon Chasan et al.

[57] ABSTRACT

Thermal reactor for mitigating or eliminating pollutants in automotive exhaust gas comprising an inner reaction chamber, an outer sleeve enclosing the reaction chamber, means for supplying cool air to the annular space thus formed between the reaction chamber and the sleeve, the chamber wall being formed with longitudinal slots (parallel to the chamber's axis) which are inclined relative to their respective radii from the center of the chamber so that air enters the chamber from the annulus and some circulates generally around the interior wall of the chamber thereby to protect it from high interior temperatures. Exhaust gas is passed to one end of the chamber from exhaust conduit(s) which are inclined in the same sense as the longitudinal slots and at roughly the same angle so that vortex circulation of exhaust gas and air is promoted in the chamber. The exhaust gas/air mixture reacts in the chamber, and purified gas passes out of the chamber at the centre of the opposite end.

13 Claims, 7 Drawing Figures

3,788,070
FIG. 4.
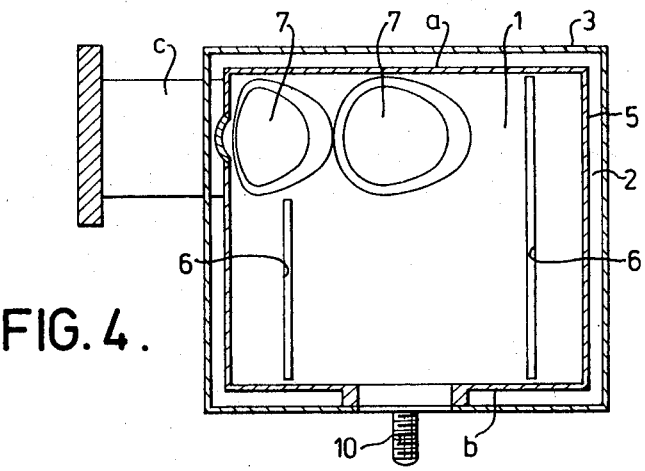
FIG. 5.
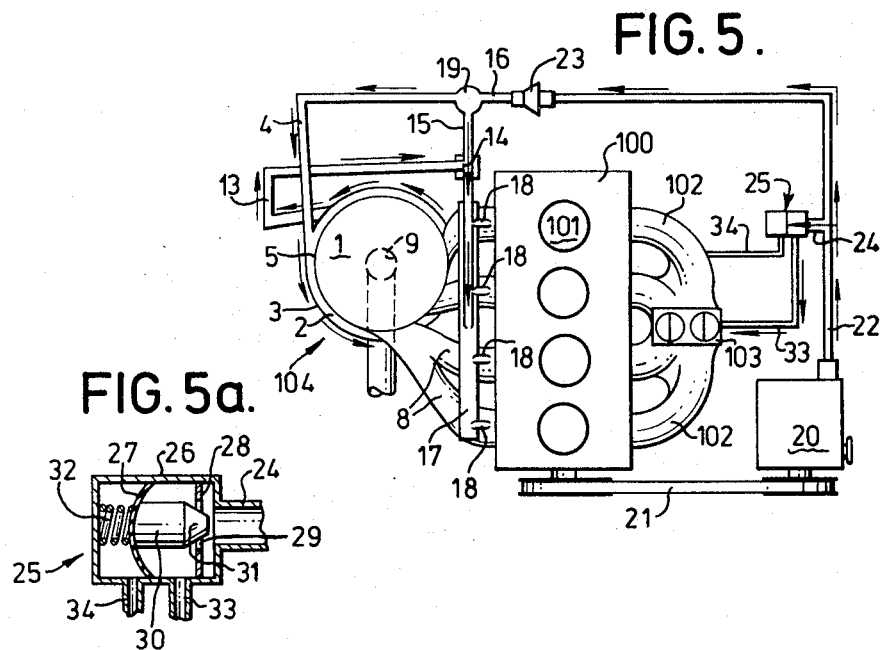
FIG. 5a.
FIG. 6.
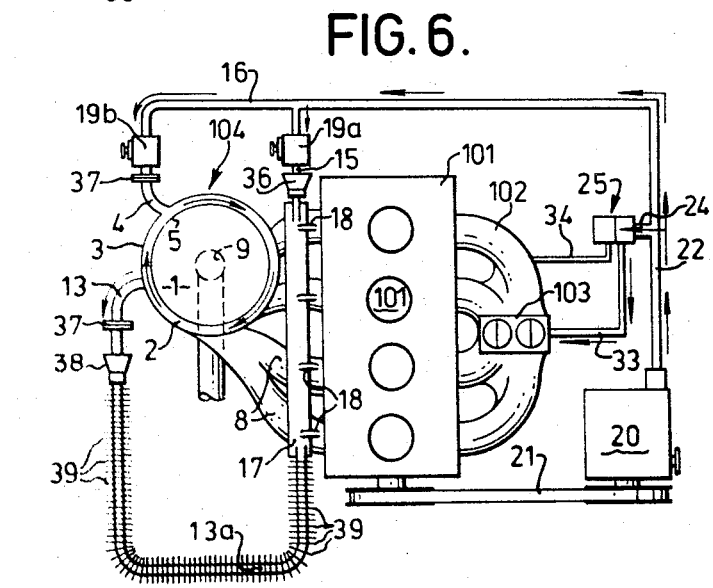

PURIFICATION OF INTERNAL COMBUSTION ENGINE EXHAUST GAS

The present invention relates to apparatus for purifying the exhaust gas from an internal combustion engine, and more particularly, relates to a catalyst-free apparatus of the thermal reactor type in which such exhaust gases are purified by reducing their content of unburned and partially burned hydrocarbons (herein abbreviated to "HC"), and carbon monoxide.

Thermal reactors are already known, and are usually located in the exhaust system downstream of the exhaust manifold and upstream of the silencer or muffler.

It is known in the art that the thermal reactors which have so far been used for purifying the exhaust gases of motor vehicles are subject to the action of high temperatures (>700° C) which develop inside them during the reaction between combustible moieties in the exhaust gas and oxygen, causing serious wear and damage to the materials of which they are made, unless adequate protective measures are adopted, such as, for instance, the injection of large amounts of excess air. The present technology has attempted to avoid thermally-caused damaged either by a) research on the production of improved materials capable of withstanding the heat stresses without appreciable damage, or b) by adopting a system of the type already known in the combustion chambers of gas turbines, viz. that of keeping the reacting gaseous mixture away from the surfaces of the reactor, with the aid of a thin film of air which acts as a screen for the metal surfaces of the reactor, preventing them from becoming overheated and avoiding the occurrence of injurious surface reactions.

Nevertheless, neither of the solutions examined has furnished satisfactory results. Indeed, the new materials proposed according to (a) have not always been found suitable, and in any case too costly, while on the other hand the heat reactors with walls protected by a film of air according to proposal (b) have been carried out in structures that are generally very complicated, consisting of a number of parts, some of which (e.g., vanes or deflectors) always end by being damaged through the action of high temperatures, after a normal period of operation.

This latter point has necessitated the use of special materials for the construction of vanes and deflectors and this, in addition to the somewhat large dimensions of the whole resulting reactor, makes its cost relatively unacceptable.

The present invention comprises apparatus for purifying the exhaust gas from the cylinder(s) of an internal combustion engine comprising a reactor hollow, generally cylindrical form, a casing member surrounding the reactor and fixedly spaced therefrom to provide an annular space between the reactor and the casing member, at least one conduit extending through the said annular space and terminating at one end of an exhaust gas entrance aperture of the reactor, and being adapted at its other end for conducting exhaust gas away from the engine, the gas conduit(s) being inclined, at the confluence with the reactor, at an angle of less than 90° with a radius from the centre of the reactor whereby at least some exhaust gas entering the reactor from conduit(s), during operation, is caused to flow substantially tangentially with respect to, or substantially parallel with, the inside wall of the reaction chamber at least one pipe communicating with the annular space for the supply of air to the annular space, a plurality of apertures in the wall of the reactor for permitting cooling air to pass from the annular space into the reactor, the walls of each of said apertures being inclined, relative to respective radii from the centre of the reactor, at an angle of less than 90° and in the same sense as the said gas conduit(s) whereby to cause at least some air passing into the reactor from said apertures to flow generally tangentially relative to, or generally parallel to, the inside wall of the reactor, an exhaust conduit extending at least between a gas escape orifice defined in the wall of the reactor, and an adjacent discharge orifice in the wall of the casing member.

The actual angle of inclination of the walls of the apertures in the reactor can vary over wide limits, but preferred angles are in the range of from 30° to 75° and within this range, the apparatus of the invention provides satisfactory elimination of CO and HC's. The most preferred angle is about 60°, this being a compromise between larger angles which strongly promote air flow around the internal wall of the reactor, and the smaller angles which are easier to form in thin sheet metal. The metal may be sheet steel having a thickness in the range of 1.0 to 3.5 mms., preferably 1.5 to 2.0 mms. thick.

In order to maintain the temperatures in the reactor, during operation, adequately high for the combustion of CO and HC, it is preferred that the axial length of the reactor should be substantially equal to its effective diameter (the effective diameter is the quotient of four times the cross-section area divided by the periphery). A preferred form of the reactor and the casing member is cylindrical.

The gas escape orifice is preferably defined by a wall at one axial end of the reactor, the other axial end being closed off, and the or each entrance aperture for the exhaust gas is located adjacent to the closed-off end of the reactor.

The inclined air apertures in the reactor walls each may be in the form of circumferentially spaced elongated slots which extend parallel to the axis of the reactor over substantially the whole length of the reactor wall: those slots which extend towards the exhaust gas conduits preferably do not extend completely up to the conduits.

The apparatus may further comprise an air off-take tube connected to the casing member and communicating with the annular space, the off-take tube serving to conduct out of the annular space any air which does not pass into the reactor, the air supply pipe being connected for delivery of air to the annular space in a generally circumferential direction away from the air take-off tube, the air off-take tube being so arranged as to receive air from the annular space from a generally circumferential direction away from the air cooling pipe. By this arrangement of the air-supply and air off-take pipes, the possibility that air will pass directly from the supply to the off-take pipe is more or less eliminated. The air off-take pipe and the air supply pipe are preferably near to, or at, opposite ends of the reactor in order to decrease further the possibity of short-circuiting of air from the supply pipe to the off-take pipe.

The off-take pipe may be connected to a distributor having air distributing means for distributing air from the off-take pipe into a region contiguous with the said other end of the exhaust gas conduit for mixing air with exhaust gas in said region. It is preferred that the air thus distributed is directed towards the exhaust valves and ports of the engine to cool the valves and ports, and to causing mixing of air with the exhaust gas when the exhaust gas is at its highest accessible temperature.

Air which passes into the off-take pipe from the annulus will be relatively warm, and means may be provided for reducing the temperature of the air in the off-take pipe to maintain a maximum air flow therethrough.

It is advantageous to ensure, as far as possible, that heat losses from the reactor and casing member are minimised, and to this end, the air supply pipe and the air off-take pipe may each be provided with a flange-joint having a gasket seal therein, the seals serving to mitigate heat conduction across the flange-joints. Thus, a jacket of relatively cool air is maintained in the annular space around the reactor, while some of the air passes through the inclined apertures into the reactor and, due to the tangential or vortex flow of gases therein, at least some of the air which passes into the reactor forms and replenishes a thin film of relatively cool air or air-gas mixture which protects the reactor wall from the potentially damaging effects of the high temperature burning gases enclosed by the thin film. Air which passes into the reactor to mix with the high temperature exhaust gas inwardly of the thin cool film is available as a source of oxygen for reaction with potentially pollutant combustible materials in the exhaust gas, the volume of the reactor being so chosen, according to principles which are known in the art, to provide an adequate residence time for a required degree of combustion of said pollutant materials. During operation, the gases in the reactor should attain temperatures of 700° C or more, and preferably at least 800° C, to ensure oxidation of most of the hydrocarbons and hydrocarbon products and 90 percent or more of the carbon monoxide in the exhaust gas, while the temperature of the reactor wall is always at least 200° C to 300° C lower than the reacting gas temperature — e.g., the wall temperature may be 400° to 500° C (or lower).

It has been found that satisfactory operation of the apparatus of the invention occurs even under conditions arising from defective ignition in the engine, the use of an over-rich fuel-air mixture, or other defects in the engine.

The reactor may be relatively small, and most European automobiles would have sufficient space in the engine compartment for receiving the reactor and its surrounding casing member.

The apparatus preferably further comprises means for supplying air, which means comprises an air pump or air fan driven directly from the engine or indirectly from an electrical power source, and ducting operatively connected to the pump or fan, to the air supply pipe and to the air distributor, there being means for regulating the absolute amounts, and the relative proportions, of air passing to the air supply pipe and to the distributor. In one type of apparatus of the invention, there may be provided means responsive to the reactor temperature to shut off the supply of air to the annular space until the reactor attains a predetermined minimum temperature: in this way the reactor may attain its normal operating temperature more rapidly. Such a temperature responsive means may comprise a bimetallic strip at the reactor end of the air supply pipe which acts on a throttle in the air supply pipe either directly by mechanical linkage, or indirectly by acting as part of an electrical relay.

The apparatus of the invention may further comprise a valve operatively connected on one side to the air supply means and which valve is biassed towards a closed position in which the passage of air therethrough is prevented, a conduit operatively connected at one end to the other side of the valve and which is connectable, at its other end, to an intake manifold of the engine, and means responsive to a selected depression of pressure in a tube wich is connectable to the intake manifold for causing movement of the valve away from its closed position, thereby permitting the passage of air from the air supply means to the said conduit for passage into the intake manifold. This arrangement as described prevents the intake manifold pressure from falling so low during certain engine operating conditions particularly deceleration at high speeds) that over-enrichment of the fuel-air charge drawn into the cylinders of the engine is mitigated, at least to some extent, thereby mitigating the amount of unburned and partially burned fuel which leaves the engine in the exhaust gas.

The apparatus preferably comprises a plurality of exhaust gas conduits (e.g., one for each cylinder), the conduits all being disposed in or approximately in, the same plane, and which plane is perpendicular to the axis of the reactor.

The invention further includes the combination of a carburretted internal combustion engine having an intake manifold and at least one exhaust valve or port, in operative connection with apparatus as described hereinabove, with a respective exhaust gas conduit being connected to the engine for receiving exhaust gas from a respective exhaust valve.

Embodiments of the invention, given by way of non-limitative example only, will now be described with reference to the accompanying drawings, in which:

FIG. 4 is a vertical cross-sectional elevation on line B—B of FIG. 2;

FIG. 5 is a schematic plan view of another engine arrangement adapted in accordance with the invention;

FIG. 5a shows a cross-sectional view of the main components of a valve incorporated in the engine arrangement of FIG. 5, and FIG. 6 shows a schematic plan view of another engine arrangement adapted in accordance with the invention.

Figure 1:
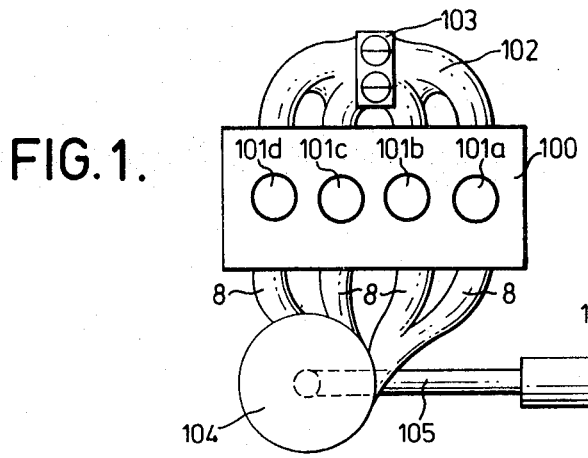
FIG. 1 is a schematic plan view of a four-cylinder gasoline engine arrangement adapted in accordance with the invention.

Referring first to FIG. 1, there is depicted an engine cylinder block 100 having 4 cylinders 101a, 101b, 101c and 101d, and one side of the block 101, an inlet manifold 102 having a carburettor 103 mounted thereon, and respective fuel-air mixture inlet pipes connecting the inlet manifold 102 to each cylinder 101.

On the opposite side of the block 100 from the inlet manifold 102, hot exhaust gases escape from each cylinder 101 through a respective curved pipe 8, the pipes 8 heading to an exhaust gas thermal reactor 104 whencefrom exhaust gas is passed to atmosphere via an exhaust pipe 105 and a silencer or muffler 106.

Figure 2:
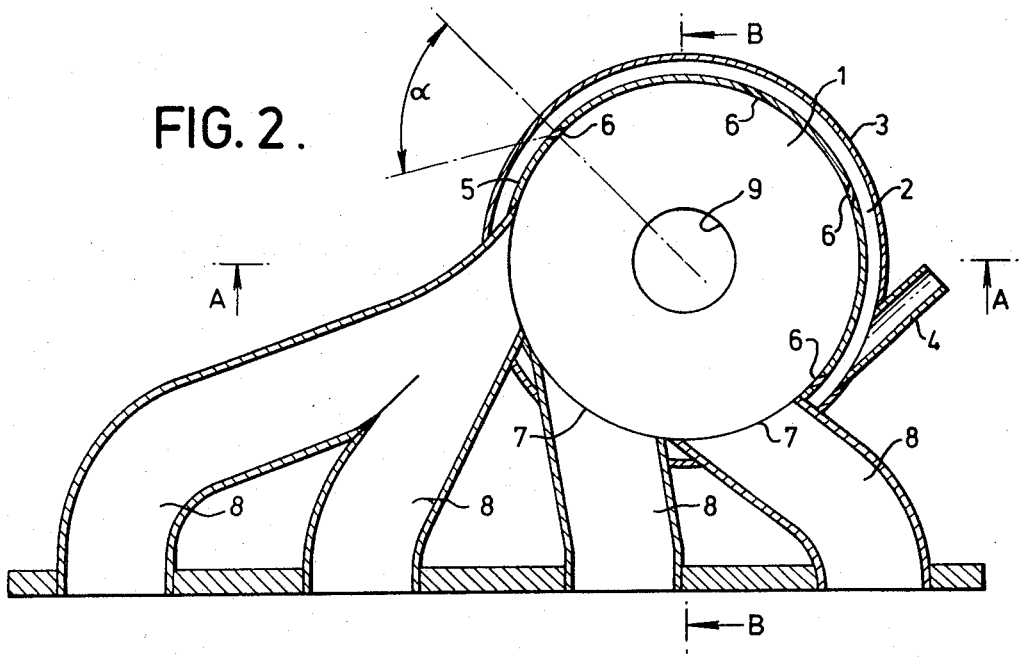
FIG. 2 is a plan view of a horizontal section of part of the engine arrangement of FIG. 1.
Figure 3:
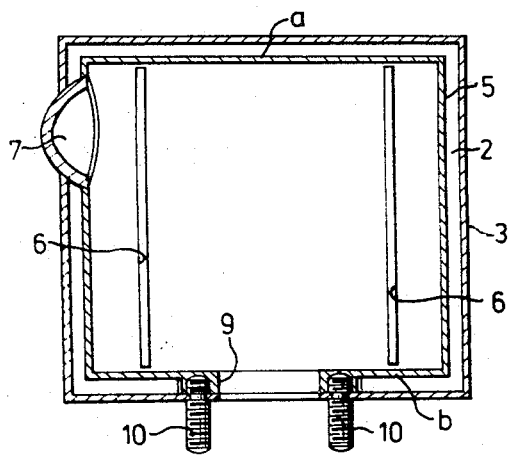
FIG. 3 is a vertical cross-sectional elevation on line A—A of FIG. 2.

With reference now to FIGS. 2, 3 and 4 of the drawings, there will be seen the reaction chamber of the thermal reactor 103 in the form of a hollow truncated cylinder 1 surrounded by an air gap 2 outwardly defined by a casing member wall 3 and communicating at 4 with a source of supply of cooling air, delivered by a pump (not shown) of low output (e.g., maximum delivery pressure 1.3 atmospheres). Through the wall 5 of the reactor chamber, longitudinal slit apertures 6 are formed which are equally apart in a circumferential sense and parallel to the axis of the reactor, extending throughout the entire length of the said reaction chamber 1, but without reaching the edges (a) and (b) (see in particular FIGS. 3 and 4), with the exception of some strips of the lateral surface (see FIG. 4), opposite which, and on a portion bounded by a sector (c) are formed apertures 7 for the intake of the mixture of discharged exhaust gas preferably mixed with secondary air at the exhaust valve ports, as hereinafter described, from the pipes 8. An exhaust gas escape or discharge aperture of the reaction chamber 1 is indicated by reference 9. The pipes 8 each discharge their exhaust gas (and any secondary air) into the reaction chamber 1 at an angle, relative to a radius drawn to respective pipes 8, of less than 90° so that exhaust gas rotates in a vortex in the chamber generally parallel to or tangential to the wall 5 of the chamber 1.

As will be noted only in FIGS. 3 and 4, the external casing 3 and the internal casing 5 on each side of the air gap 2 are connected rigidly opposite the outlet aperture 9 by means of fixing bolts 10.

It should be noted that the sides of the slits 6 are inclined in relation to the corresponding radii so as to form with them an angle alpha = 60°. This, together with the formation of a tangential flow of the exhaust gas (with any admixed secondary air), makes it possible to carry out one of the primary characteristics of the invention, viz, the formation inside the reaction chamber, throughout the entire inner wall of the casing 5, of a thin annular layer of air coming from 4 through the gap 2 and the slits 6. The said layer, which adheres closely to the said casing 5 is constantly being renewed and thus protects the actual casing from the risk of excessive heating. As stated, the temperature of the said casing does not exceed 500° C, while inside the reaction chamber and its protective layer of air, the temperature is about 700° C.

The arrangement of the intake apertures 7 for the mixture of exhaust gas (and any secondary air) causes the formation of tangential flow currents inside the reactor, which makes it possible both to maintain a thin film of air adhering to the wall of the casing 5 and the immediate treatment of fresh portions of the incoming exhaust gas mixture as soon as it enters the reactor; combustion of potential pollutants is thus uniform, takes place more rapidly and therefore requires shorter reaction times: in consequence, reactors of reduced dimensions (compared with those of the prior art) may be employed.

Reference is now made to FIG. 5 of the drawings which again shows the cylinder block 100 and ancillaries of a carburetted internal combustion engine, and in which items common to FIGS. 1 to 4 are given the same reference numerals.

It will be seen that an air off-take pipe 13 is provided for removing from the air-containing annulus 2 any air which does not pass through the inclined slits 6 (not shown in FIG. 5) into the reaction chamber 1. The air supply pipe 4 directs air in one sense around the annulus 2 while the air off-take pipe has its off-take aperture oppositely facing with respect to the air-supply pipe 4 to ensure that air travels around the annulus before it is removed. Moreover, although not shown in FIG. 5, the air supply pipe 4 is at or near the axial end of the reactor 104 so that cool air is provided at potentially the hottest end of the reactor, namely the end to which the pipes 8 are connected, and the air off-take pipe has its off-take aperture at or near the opposite end of the reactor 104. By these relative arrangements of the positions of air supply to, and air removal from, the annulus, it is ensured as far as possible that the possibility of air passing directly from the supply pipe 4 to the off-take pipe 13 is at most very small.

The air which passes into the air off-take 13 is mixed with a main secondary air supply at a 'Tee'-junction, the main secondary air being conveyed in a pipe 15 which receives air at one end from a main air line 16 and discharges the main secondary air together with air from the off-take line 13, through perforations (not shown) into a distributor 17. The distributor 17 is provided with nozzles 18 which pass air into the region of connection of the exhaust conducting pipes 8 with the engine block, and more preferably, pass the air over the exhaust valve or port (not shown) of the engine. Thus, the exhaust valve or port is beneficially cooled to some extent, while the hot exhaust gases, immediately on discharge from the cylinders, are mixed with the air and some oxidation of unburned and incompletely burned fuel products can take place as the exhaust gases pass via the pipes 8 into the reaction chamber 1 of the reactor 104.

It will be seen from FIG. 4 that the air supply pipe 4 in addition to the main secondary air pipe 15 receives air from the main air line 16, the pipes 4, 15 and 16 being joined at a 'Tee'-junction 19. Within the junction 19 is provided means (not shown) of any suitable type for apportioning the relative quantities and absolute amounts of air passing to the pipes 4 and 15 respectively. The apportioning and regulating means may be, for example, a three-way valve or it may be restricting orifices with adjustable screws therein for regulating the cross-sectional areas of the orifices. Such valves and restricting orifices are well known to those skilled in the art, and their particular mode of construction does not form an essential part of the invention. For cheapness and reliability, it is preferred to employ restricting orifices of a non-adjustable type, and it is preferred that 40–50 percent of the air from main air line 16 is passed to the air inlet pipe 4, and the remaining 60–50 percent passed to the main secondary air line 15.

The air in the main air line 15 is supplied from a small air fan 20: a suitable fan 20 is available from General Motors under the designation "SAGINAWLCH-Z." As shown in FIG. 5,7 the fan 20 is driven directly from the engine by a belt 21 and the speeds of the engine and fan 20 are preferably 1.0: 1.6 or thereabouts. Generally speaking, when the engine speed is equivalent to 50 km/hour, the flow rate of exhaust gas and secondary air passing through the reactor should be of the order of 600–700 litres/minute, and the cooling air should be supplied (e.g., to inlet pipe 4) at a pressure of 1.3 atmospheres, or thereabouts. The air supplied at pipe 4 should preferably always be at a pressure slightly in excess of the pressure in the reactor. The air discharge pipe 22 from the fan 20 is connected to line 16 through a one-way check valve 23 so that pressure fluctuations in line 16 and downstream thereof do not substantially influence the pressure in the discharge pipe 22.

Between the fan 20 and the check valve 23 is a junction tube 24 through which air can pass to a so-called "gulp-valve" 25, the principal features of which are shown in FIG. 5a. Referring to FIGS. 5 and 5a together, it will be seen that the valve 25 comprises air-tight enclosure 26 divided near one end by a diaphragm 27 of flexible material, preferably an oil-resistant elastomer. Between the diaphragm 27 and the entrance aperture of tube 24 to the enclosure 26 is a plate 28 sealingly attached at its periphery to the inside of the enclosure 26 and provided with an aperture 29 at or near to the centre of the plate 28. A valve member 30 is attached at one end to the diaphragm 27 and has a tapered head end for sealing against the aperture 29 when the resilient diaphragm 27 is not deformed. The valve member 30 is subjected to a bias from a light compression spring 32 on the other side of the diaphragm 27 so that in its normal position, the valve member 30 closes the aperture 29. Between the plate 28 and the diaphragm, the wall of the enclosure 26 has an aperture forming the entrance to an air-pressure compensating line 33 which is connected at its other end to the inlet manifold 102 at a position beneath the carburettor 103. A pressure-sensing tube 34 communicates pressure signals which are representative of pressure fluctuations in the inlet manifold 102 to that portion of the interior of the enclosure 26 containing the spring 32.

During engine operation, any decrease in the pressure in the intake manifold 102 is communicated to the gulp-valve via sensing-tube 34, and at a pre-selectable pressure, the difference in pressure across the diaphragm 27 will be sufficiently high to cause the diaphragm to deform against the bias of the spring 32 thereby causing the valve member 30 to move from its closure position against the plate 28; the said pressure difference then causes air to pass from the junction tube 24, through the aperture 29, and via the compensating line 33 into the intake manifold, thereby tending to reduce the pressure depression therein, until the engine operating conditions or the total air flow through line 33 are such that the pressure rises sufficiently to permit the spring 32 to move the diaphragm 27 and the valve member 31 to a valve closing position in which the aperture 29 is obturated. Excessive pressure depressions occur when the throttle is partially or fully closed while the engine is operating at a relatively high speed (e.g., during deceleration) and such pressure depressions result in over-enrichment of the intake-manifold volume with fuel, most of which passes through the engine with very little complete combustion. By avoiding such pressure depressions, the waste of fuel from this cause is considerably reduced, and the operating conditions in the reactor 104 are maintained substantially constant (e.g., substantially constant temperatures in the reaction chamber 1).

Referring now to FIG. 6, the engine arrangement is more or less as in FIG. 5, and only the differences between the arrangements of FIGS. 5 and 6 are hereinafter described. The main air line 16 supplies air to the main secondary air line 15 and the air inlet pipe 4 through separate air control means, which may be either adjustable valves, adjustable orifices, or fixed restricting orifices, 19a, 19b respectively. A check valve 36 in line 15 prevents pressure fluctuations at the valve ports being communicated into the main air line 16 (and corresponds, in its function and effect, with the check valve 23 of FIG. 5).

The air inlet pipe 4 and the air off-take pipe 13 are connected to respective air conducting lines through flanged and bolted joints 37 having gasket seals (not shown) therein. This type of jointing permits easier dismantling of the pipework connected to the reactor 104, and also reduces heat loss by conduction from or into the reactor 104. The air off-take pipe 13 is connected into the secondary air distributor 17 via a pipe 13a, and a check valve 38 incorporated in pipe 13a substantially prevents pressure fluctuations in the region of the engine exhaust valves or ports from being communicated via pipe 13 into the reactor 104.

The pipe 13a may be provided with fins 39 as illustrated, or other heat dissipating means, to cool air passing through pipes 13 and 13a so that a substantially constant mass flow of air passes into the distributor 17 from off-take pipe: the provision of fins or other heat dissipating means is an optional feature depending on the arrangement and characteristics of the engine, and the amount of ventilation of the engine compartment.

A further optional feature is the provision of means responsive to the reactor temperature to cut off the flow of air from the air inlet pipe so that the air in the annulus 2 insulates the reactor 1, and heat dissopation from the reactor by a current of air in the annulus 2 is eliminated, thereby decreasing the warm-up time of the reactor. Such means are not shown, but they may take the form of a butterfly throttle valve in line 4 which is actuated by a temperature dependent signal from an electrical transducer in, or on, the exhaust pipe 105 or a bimetallic element located close to the reactor 104 which actuates a mechanical throttling device in the air line 4.

There are now given below, merely by way of illustration, the results of some tests that have been carried out by using a reactor according to the invention in a motor vehicle subjected to a standardized working cycle. The test procedure adopted is the "European Cycles" in which the engine is subjected four times to an identical cycle passing from starting at low speed to a phase at 15 km per hour, then idling for a longer phase at 30 km/hour, again at slow speed, and then a longer phase at 50 km per hour followed by a brief phase at 35 km per hour to return to idling and the repetition of the cycle. The time taken for the entire test is 20 minutes; the external temperature is 20°-30° C. With a Fiat vehicle of type 125 S, when the reactor of the invention is not used, results were obtained as given in the last line of the following table I, in whose first two lines are given the values of the percentages of CO and HC (total hydrocarbons) allowed by current international legislation.

TABLE I

|  | Cold test cycles according to European procedure (g/test) | | Test cycles with engine operating according to European procedure (g/2 cycles) | |
| --- | --- | --- | --- | --- |
|  | CO | HC | CO | HC |
| Limiting values allowed for Prototype vehicles | 134 | 9.4 | — | — |
| Vehicles in production | 161 | 12.2 | — | — |

Figures obtained with
test vehicles without
thermal reactor    148    6.2    49.5    2.33

When, however, the same vehicle (Fiat 125 S) is fitted with the reactor system according to this invention, and by injecting secondary air immediately adjacent to the exhaust valves, raising the size of the carburettor jets (double body two venturi Webber carburettors) from the dimension of 130–160 to 145–160 mm/100 diameter and by increasing the production of CO at least from 3.8 to 6.5 percent, the following figures for emission are obtained.

TABLE II

| Cold Tests, g/test | | Hot tests g/2 cycles | |
|---|---|---|---|
| CO | HC | CO | HC |
| 40.00 | 1.0 | 13.5 | 0.22 |

This shows the benefits arising from use of the reactor system according to the invention (reduction in the percentage of CO by 75 percent and HC by 80 percent).

It should be noted that by further modification of the carburettor it is possible further to reduce these figures, although at the cost of a slight increase in fuel consumption (6–8 percent).

For instance, it has been noted in experiments that have been carried out that by varying carburation and above all the quantitative ratio between secondary air and exhaust gas to keep the temperature in the reaction chamber above 700° C and to raise the content of oxygen in the discharge gas to 1.5 percent, the following figures are found in the two types of cycles mentioned: CO 23.9, HC 0.9; CO 5.3; HC 0.13. thus obtaining greater purification and attaining the values: CO 15.0, HC 0.35; CO 4.1, HC 0.06. when effecting a delay of about 10 percent in advance at slow speed confined to the first cycle, i.e., when the engine, bieng cold, tends to produce higher percentages of CO and HC in the exhaust gas.

The present invention has been described with particular reference to its specific embodiments but it is intended that variations and modifications may in practice be made without departing from the invention as defined in the claims.

We claim:

1. Apparatus for purifying the exhaust gas from a cylinder of an internal combustion engine comprising a reactor of hollow, generally cylindrical form, a casing member surrounding the reactor and fixedly spaced therefrom to provide an annular space between the reactor and the casing member, at least one conduit extending through the said annular space and terminating at one end in an exhaust gas entrnace aperture of the reactor, and being adapted at its other end for conducting exhaust gas away from the engine, the gas conduit being inclined, at the confluence with the reactor, at an angle of less than 90° with a radius from the centre of the reactor whereby at least some exhaust gas entering the reactor from the conduit, during operation, is caused to flow substantially tangentially with respect to, or substantially parallel with, the inside wall of the reaction chamber, at least one pipe communicating with the annular space for the supply of air to the annular space, a plurality of apertures in the wall of the reactor for permitting cooling air to pass from the annular space into the reactor, the walls of each of said apertures being inclined, relative to respective radii from the centre of the reactor, at an angle of less than 90° and in the same sense as the said conduit whereby to cause at least some air passing into the reactor from said apertures to flow generally tangentially relative to, or generally parallel to, the inside wall of the reactor, an exhaust conduit extending at least between a gas escape orifice defined in the wall of the reactor, and an adjacent discharge orifice in the wall of the casing member.

2. Apparatus according to claim 1 in which the said angle of inclination of the walls of the apertures is from 30° to 75°.

3. Apparatus according to claim 1 in which the axial length of the reactor is substantially equal to its effective diameter.

4. Apparatus according to claim 1 in which the gas escape orifice is defined by a wall at one axial end of the reactor being closed off, and the entrance aperture for the exhaust gas being adjacent the closed off end of the reactor.

5. Apparatus according to claim 1 in which the said apertures in the reactor walls are each in the form of circumferentially spaced elongated slots which extend parallel to the axis of the reactor over substantially the whole length of the reactor wall.

6. Apparatus according to claim 1 in which there is provided an air off-take tube communicating with the annular space for the passage of air which does not pass through the apertures in the reactor, the air supply pipe being connected for delivery of air to the annular space in a generally circumferential direction away from the air off-take pipe, and the off-take pipe being arranged to receive air from the annular space from a generally circumferential direction away from the air cooling pipe.

7. Apparatus according to claim 6 in which the air off-take tube and the air supply pipe are substantially adjacent opposite ends of the reactor.

8. Apparatus according to claim 7 in which the air take-off tube is connected to a distributor having air distributing means for distributing air from said off-take tube into a region contiguous with the said other end of the exhaust gas conduit for mixing air with exhaust gas in said region.

9. Apparatus according to claim 8 comprising means for cooling the off-take tube for reducing the temperature of any air therein.

10. Apparatus according to claim 9 in which the air supply pipe is connected to an air supply conduit by means of a flange-joint having a gasket seal therein, and the air off-take tube is connected to said distributor by means comprising a flange-joint having a gasket seal therein whereby heat loss by conduction from the reactor and casing member is substantially reduced.

11. Apparatus according to claim 8 further comprising means for supplying air, said means comprising an air pump or fan, ducting operatively connected to the pump or fan and to the air supply pipe and to the air distributor, and means for regulating the amount and relative proportions of air passing to the air supply pipe and to the distributor.

12. Apparatus according to claim 11 comprising a valve operatively connected on one side to the air supply means, said valve being biassed towards a closed position in which the passage of air therethrough is prevented, a conduit operatively connected at one end to the other side of the valve and which is connectable, at its other end, to an intake manifold of the engine, and means responsive to a selected depression of pressure in a tube which is connectable to the intake manifold for causing movement of the valve away from its closed position, thereby permitting the passage of air from the air supply means to the said conduit for passsage into the intake manifold.

13. Apparatus according to claim 1 comprising a plurality of exhaust gas conduits, the conduits all being disposed substantially in a common plane, the said plane being substantially perpendicular to the axis of the reactor.

* * * * *